US009789987B2

(12) United States Patent
Persson

(10) Patent No.: US 9,789,987 B2
(45) Date of Patent: *Oct. 17, 2017

(54) APPARATUS FOR SEALING AN OPEN END OF A CONTAINER

(71) Applicant: TETRA LAVAL HOLDINGS & FINANCE S.A., Pully (CH)

(72) Inventor: Richard Persson, Haljarp (SE)

(73) Assignee: TETRA LAVAL HOLDINGS & FINANCE S.A., Pully (CH)

(*) Notice: Subject to any disclaimer, the term of this patent is extended or adjusted under 35 U.S.C. 154(b) by 0 days.

This patent is subject to a terminal disclaimer.

(21) Appl. No.: 15/376,435

(22) Filed: Dec. 12, 2016

(65) Prior Publication Data

US 2017/0088300 A1 Mar. 30, 2017

Related U.S. Application Data

(63) Continuation of application No. 13/818,504, filed as application No. PCT/EP2011/064331 on Aug. 22, 2011, now Pat. No. 9,533,780.

(30) Foreign Application Priority Data

Sep. 6, 2010 (SE) ...................... 1000902

(51) Int. Cl.
*B65B 51/00* (2006.01)
*B65B 51/30* (2006.01)
(Continued)

(52) U.S. Cl.
CPC ............ *B65B 51/30* (2013.01); *B29C 65/368* (2013.01); *B29C 65/3656* (2013.01);
(Continued)

(58) Field of Classification Search
CPC .... B65B 9/06; B65B 9/08; B65B 9/20; B65B 51/16; B29C 66/536; B29C 66/83523;
(Continued)

(56) References Cited

U.S. PATENT DOCUMENTS 2,606,412 A 8/1958 Salfisberg
3,245,197 A 4/1966 Van Mil, Jr. et al.
(Continued)

FOREIGN PATENT DOCUMENTS

CN 1314835 A 9/2001
CN 101016090 A 8/2007
(Continued)

OTHER PUBLICATIONS

International Search Report (PCT/ISA/210) issued on Feb. 22, 2012, by the European Patent Office as the International Searching Authority for International Application No. PCT/EP2011/064331.

*Primary Examiner* — Andrew M Tecco
*Assistant Examiner* — Chelsea Stinson
(74) *Attorney, Agent, or Firm* — Buchanan Ingersoll & Rooney

(57) ABSTRACT

An apparatus for sealing an open end of a package comprises a first longitudinally extending sealing jaw, bearing mounted on a first eccentric shaft rotatable around a first rotational axis, and a second longitudinally extending sealing jaw, bearing mounted on a second eccentric shaft rotatable around a second rotational axis, the second sealing jaw being parallel with the first sealing jaw. At least one motor drives rotation around the first and second rotational axis in opposite directions, wherein the first and the second sealing jaws oppose each other, and are allowed to oscillate between sealing and open positions by moving towards and away from each other. A first and second transversally extending guiding bar cooperate with the first and second eccentric
(Continued)

shaft via guiding pins running in guiding grooves, such that transverse play between the first and the second eccentric shaft and the first and second sealing jaw is allowed.

16 Claims, 3 Drawing Sheets

(51) Int. Cl.
B65B 9/20 (2012.01)
B65B 51/22 (2006.01)
B29C 65/36 (2006.01)
B29C 65/00 (2006.01)
B29K 705/02 (2006.01)
B29L 31/00 (2006.01)

(52) U.S. Cl.
CPC .. B29C 66/43121 (2013.01); B29C 66/72321 (2013.01); B29C 66/82265 (2013.01); B29C 66/83221 (2013.01); B29C 66/849 (2013.01); B65B 9/20 (2013.01); B65B 51/227 (2013.01); B29K 2705/02 (2013.01); B29L 2031/712 (2013.01)

(58) Field of Classification Search
CPC .......... B29C 66/8226; B29C 66/82263; B29C 66/82265
USPC ............... 53/373.2, 450, 451, 476, 477, 551
See application file for complete search history.

(56) References Cited

U.S. PATENT DOCUMENTS

| | | |
|---|---|---|
| 3,850,780 A | 11/1974 | Crawford |
| 4,663,917 A | 5/1987 | Taylor |
| 4,750,313 A | 6/1988 | Kammler |
| 4,996,825 A | 3/1991 | Bacon |
| 5,488,812 A | 2/1996 | Stark et al. |
| 5,753,067 A | 5/1998 | Fukuda |
| 5,791,126 A | 8/1998 | Kammler |
| 5,836,136 A | 11/1998 | Highberger |
| 5,921,068 A | 7/1999 | Fangmeier |
| 5,992,131 A | 11/1999 | Iwano |
| 6,138,442 A | 10/2000 | Howard et al. |
| 6,178,719 B1 | 1/2001 | Hansen |
| 6,185,915 B1 | 2/2001 | Chang |
| 6,367,230 B1 | 4/2002 | Fukuda |
| 6,421,987 B1 * | 7/2002 | Fukuda .................. B29C 65/18 53/371.6 |
| 6,427,422 B2 | 8/2002 | Nakagawa |
| 6,505,664 B1 | 1/2003 | Blundell |
| 6,729,113 B2 | 5/2004 | Miyamoto |
| 7,171,795 B2 | 2/2007 | Kondo |
| 7,367,171 B2 | 5/2008 | Bertram |
| 2008/0066430 A1 | 3/2008 | Lubezny |
| 2012/0285130 A1 | 11/2012 | Kamigaito |
| 2013/0014476 A1 | 1/2013 | Stork |

FOREIGN PATENT DOCUMENTS

| | | |
|---|---|---|
| EP | 0 615 909 A1 | 9/1994 |
| FR | 2 338 858 A1 | 8/1977 |
| FR | 2 893 306 A1 | 5/2007 |
| GB | 1 577 732 | 10/1980 |
| JP | 2008-230693 A | 10/2008 |
| WO | WO 00/06350 A1 | 2/2000 |

* cited by examiner

APPARATUS FOR SEALING AN OPEN END OF A CONTAINER

CROSS REFERENCE TO RELATED APPLICATIONS

This application is a continuation application of U.S. patent application Ser. No. 13/818,504 filed on Feb. 22, 2013, which is a U.S. National Stage application based on International Patent Application No. PCT/EP2011/064331 filed on Aug. 22, 2011, which claims priority to Swedish Patent Application No. 1000902-5 filed on Sep. 6, 2010, the entire content of all three of which is incorporated herein by reference.

TECHNICAL FIELD

The present invention pertains in general to the field of an apparatus for sealing an open end of a container. Specifically, the present invention relates to an apparatus for the arrangement and steering of sealing jaws in the sealing operation of an open end of a container.

TECHNICAL BACKGROUND

Apparatuses for packaging pourable food in containers comprise a number of units for performing a number of steps. In short, such an apparatus may comprise the steps of forming a tube of a web of packaging material, forming sleeves from the tube by transversally sealing one end of the tube and/or cutting the tube, folding containers from said sleeves to their intended final form, filling said containers with the pourable food, and finally sealing the other end of the containers. The second opening sealing step, i.e. the step of finally sealing the container, is performed when the containers are in horizontal movement. Further, the folding step can be divided into a number of sub-steps. For example, during a first folding sub-step, performed in association to the sealing step, a section of a sleeve/container being sealed may be formed to have a rectangular cross-section. In a second folding sub-step, the sleeve/container may be folded in such a way that a rectangular base is achieved, e.g. by folding the outer ends of the sealing end into the middle of the sealing.

In the sealing steps two sealing jaws may be arranged on opposing sides of the sleeve. Reciprocating movement of the sealing jaws may then create a seal transversally in respect of the longitudinal axis of the sleeve. To ensure the obtainment of a secure and tight seal and to avoid unnecessary wear on the equipment, such as the sealing jaws, or bearings, gears, etc, affected by the movement of the sealing jaws, one wishes to make sure that the sealing jaws are parallel to each other during the reciprocating movement, and especially during the interaction between the two.

It is known within the field of a vertical flow path of containers, such as in U.S. Pat. No. 2,606,412, U.S. Pat. No. 3,245,197, and U.S. Pat. No. 6,138,442, to use guide rods arranged transversally to the longitudinal extension of the sealing jaws. These guiding rods are driven by the same end motor, which means that a motor position error, e.g. due to mechanical wear, or synchronization errors between several motors induces high strain on the system and the guiding rods, resulting in fast wear. These guide rods also run through the sealing jaws, such that the sealing jaws necessarily are kept in the same plane during the entire rotational cycle, with respect to each other. In systems wherein the sealing jaws are intended to also oscillate in the vertical plane, the strain on the guide rods will be high, resulting in fast material wear and thus more frequent stops in the production and exchange of parts. As a consequence of the position of these guide rods, there will also be a need of demounting the entire sealing apparatus to perform maintenance on or exchange of the guiding rods. Also, since the guide rods run through the sealing jaws the guide rods will wear on the sealing jaws, bringing about a more frequent exchange of the expensive sealing jaws. Furthermore, the sealing pattern of the sealing jaws is affected or limited, and it will be impossible to transport containers, sleeves, tubes, webs, etc in a horizontal and longitudinal direction, without the need of complicated elevating or lowering actions of the sealing jaws and/or the containers, sleeves, tubes, webs, etc, since the guiding rods will be in the pathway.

Hence, a new apparatus for sealing containers in horizontal movement would be advantageous, and especially an apparatus allowing for parallel alignment of sealing jaws, while simultaneously providing a durable and high resistant alignment system, decreasing wear on material, increasing productivity, alleviating exchange of parts, decrease wear on the sealing jaws, and decreasing the limitation on possible sealing patterns and/or areas.

SUMMARY

Accordingly, the present invention preferably seeks to mitigate, alleviate or eliminate one or more of the above-identified deficiencies in the art and disadvantages singly or in any combination and solves at least the above mentioned problems e.g. by providing an apparatus for sealing an open end of a package, said apparatus comprising a first longitudinally extending sealing jaw, bearing mounted on a first eccentric shaft, said first eccentric shaft rotating around a first rotational axis; a second longitudinally extending sealing jaw, bearing mounted on a second eccentric shaft, said second eccentric shaft rotating around a second rotational axis, said second sealing jaw being parallel with said first sealing jaw; at least one motor driving the rotation around said first and second rotational axis in opposite directions; wherein the first and the second sealing jaws are opposing each other, and are allowed to oscillate between a sealing and an open position, by moving towards and away from each other; a first and a second transversally extending guiding bar, bearing mounted between said first and second eccentric shaft; said first and a second transversally extending guiding bar cooperating with said first and second eccentric shaft via guiding pins running in guiding grooves, such that a play between the first and the second eccentric shaft and the first and second sealing jaw is allowed in the transversal direction.

Further advantages and preferred embodiments will be apparent from the dependent claims.

BRIEF DESCRIPTION OF DRAWINGS

These and other aspects, features and advantages of which the invention is capable of will be apparent and elucidated from the following description of embodiments of the present invention, reference being made to the accompanying drawings, in which.

DETAILED DESCRIPTION OF EMBODIMENTS

Several embodiments of the present invention will be described in more detail below with reference to the accompanying drawings, in order for those skilled in the art to be able to carry out the invention. These embodiments are provided so that this disclosure will be thorough and complete, and will fully convey the scope of the invention to those skilled in the art.

Figure 1:
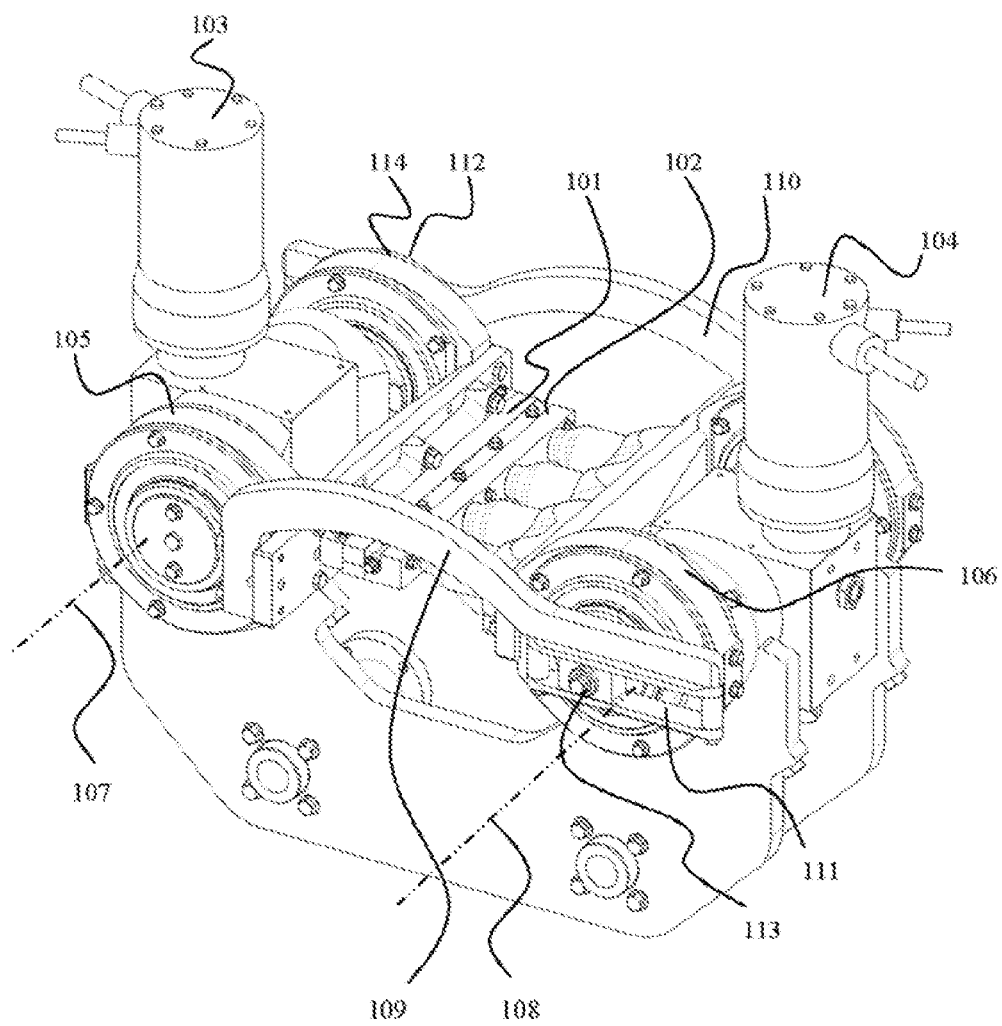
FIG. 1 is a perspective view of an embodiment of the present invention.

According to a first embodiment, illustrated in FIG. 1, an apparatus is disclosed, said apparatus comprising a first and a second longitudinally extending sealing jaw 101, 102, arranged on opposing sides of a flow path of a sleeve of a packaging material or a semi manufactured container/package, partly folded and raised and transported in a horizontal and longitudinal direction through the apparatus. For convenience purposes only the sleeve embodiment will be referred to below. Reciprocating/oscillating movement of the sealing jaws 101, 102 may then create a seal transversally in respect of the longitudinal axis of the sleeve. The reciprocating/oscillating movement comprises pushing and pulling the sealing jaws 101, 102 together and apart, respectively, between a sealing and an open position.

In one embodiment an induction element may be arranged laterally of the first sealing jaw 101, i.e. behind the sealing surface of the first sealing jaw 101. The induction element will heat an aluminum foil in the sleeve material and optionally metal parts of the sealing jaws 101, 102 or the sealing surface thereof, respectively, whereby a plastic film in the sleeve material will be melted, such that the sleeve will be sealed when the two sides of the sleeve are pressed together. Alternatively, the sleeve and the plastic film comprised therein may be preheated before the sealing step.

A first and a second servomotor 103, 104 drive the reciprocating movement. To this end, the first and the second servomotor 103, 104 rotate a first and a second eccentric shaft 105, 106 about a first and a second rotational axis 107, 108. The first and a second eccentric shaft 105, 106 may be driven/rotated in one direction when the first and second sealing jaws 101, 102 are pushed together, and the other direction when the first and second sealing jaws 101, 102 are pulled apart. When the eccentric shafts 105, 106 are driven in opposite directions depending on if they push the sealing jaws together or if they pull them apart, the needed space for the rotation of the sealing jaws 101, 102 may be decreased. Also, the sealing action may push the package/container somewhat downwards, where after the sealing action may be ceased and the sealing jaws then being rotated the other way, allowing for the package/container to maintain a preferred width also in the top region. Due to the specific configuration of the different parts of the apparatus, the servomotors 103, 104 may be arranged beneath a table carrying the apparatus, whereby the space above the apparatus may be kept free, thus lowering the risk of filling product contamination.

The eccentric shafts 105, 106 have a greater longitudinal extension than the sealing jaws 101,102. Analogously, the sealing jaws 101, 102 have anterior and posterior ends within the longitudinal extensions of the eccentric shafts 105, 106. Thus, the eccentric shafts 105, 106 have anterior and posterior ends located anteriorly and posteriorly of the anterior and posterior ends of the sealing jaws 101, 102 respectively.

A first and a second guiding bar 109, 110 is bearing mounted on said first and second eccentric shaft 105, 106, respectively. The guiding bars 109, 110 are arranged transversally and perpendicularly to the longitudinal extension of the first and the second sealing jaw 101, 102. The first guiding bar 109 may for example be attached in its proximal end to the posterior end of the eccentric shaft 105, while the second guiding bar 110 may be attached in its proximal end to the anterior end of the eccentric shaft 106. Thus, the guiding bars 109, 110 may be arranged anteriorly and posteriorly, respectively, in relation to the sealing jaws 101, 102. Distally, such as in the distal end, the guiding bars 109, 110 are provided with a guiding groove 111, 112. The guiding grooves 111, 112 are aligned substantially horizontally. When the guiding bars 109, 110 are arranged anteriorly and posteriorly, respectively, in relation to the sealing jaws 101, 102, the replacement of the specific parts may be performed in an easy way. For example, there will be no need for demounting the eccentric shafts, sealing jaws, and guiding bars to replace a guiding bar or bushings related thereto. Guiding bars being independent of the sealing jaws by the use of separate guiding pins and grooves, in respect of their communication with the eccentric shafts and the alignment of the sealing jaws, eliminates the need of complicated arrangements of induction elements, when such are used in connection to the sealing jaws.

In one embodiment the guiding bars 109, 110 are arched upwardly, such that a free passage of sleeves, semi manufactured containers and/or containers in the horizontal longitudinal direction is allowed.

Each guiding groove 111, 112 enclose and cooperate with a guiding pin 113, 114, arranged on the eccentric shaft 105, 106. The guiding pin 113 may thus be arranged in the anterior end of the eccentric shaft 105, and the guiding pin 114 may be arranged in the posterior end of the eccentric shaft 106. In this way, a play between the first and the second eccentric shaft 105, 106 and the first and second sealing jaw 101, 102 is allowed in the transversal direction, since the guiding pin 113, 114 will run transversally in the guiding groove during rotation of the eccentric shafts 105, 106. Also, since the guiding pin is allowed to rotate within the guiding groove, small plays in the vertical direction will be allowed and compensated for, without undue strain on the system and the parts thereof, while still keeping the sealing jaws 101, 102 aligned. Thus, the eccentric shafts 105, 106 may rotate about the first and the second rotational axis 107, 108, respectively, making the sealing jaws reciprocate/oscillate between the sealing and open positions. When each eccentric shaft 105, 106 is provided with a guiding bar 109, 110 extending distally towards the other eccentric shaft in opposite ends of the eccentric shafts, the interaction between the guiding grooves and guiding pins will allow for a mutual stabilization of the eccentric shafts 105, 106, such that a parallel position of the sealing jaws 101, 102 is maintained, regardless of eccenter movement. Thus, this arrangement also allows for asymmetrical movement of the eccenter axes. This means that a failure in one of the servomotor position error, e.g. due to mechanical wear, or synchronization errors between the servomotors may be compensated for by the interaction between the eccentric shafts 105, 106, eliminating the problems associated with unimotor alignment control.

Figure 2A:
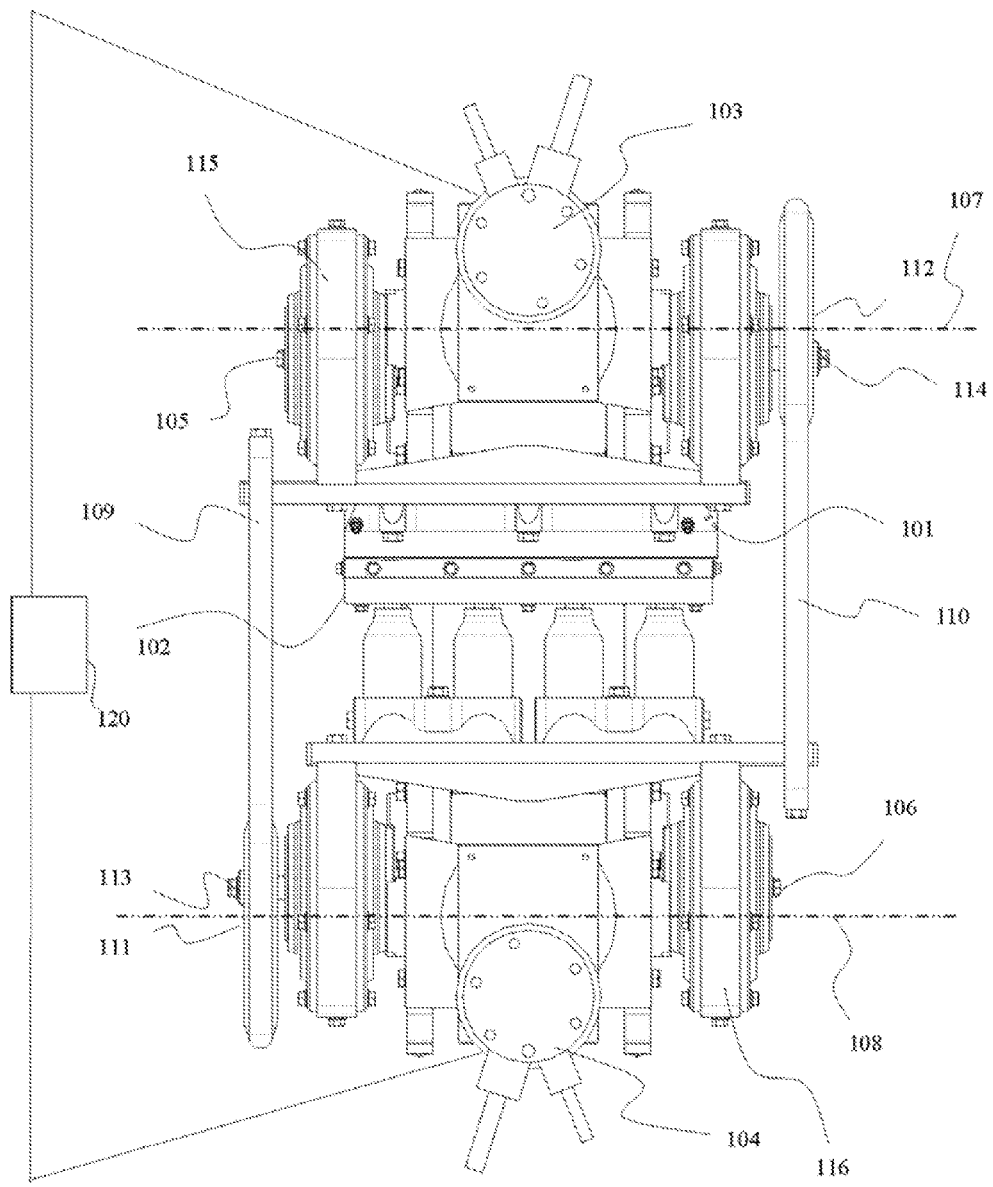
FIG. 2a is a top view of one embodiment of the present invention illustrating a closed position of the first and second sealing jaws.
Figure 2B:
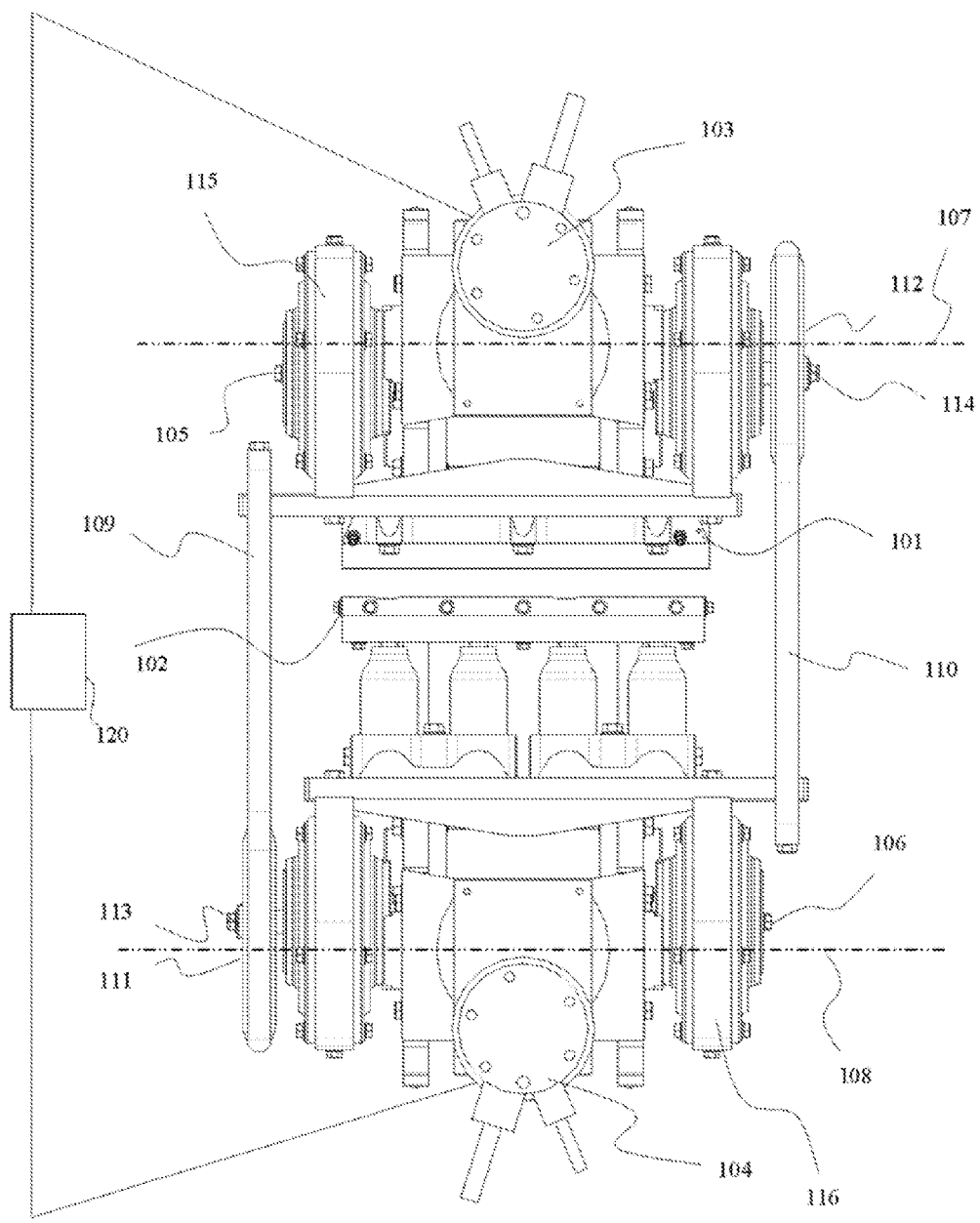
FIG. 2b is a top view of one embodiment of an apparatus for sealing an open end of a package, illustrating an open position of the first and second sealing jaws.

As illustrated in FIG. 2a and FIG. 2b, eccentering units 115, 116 may be arranged in the ends of shafts related to the first and second rotational axes 107, 108, respectively, creating the eccentric shafts 105, 106, respectively. When the eccentric shafts 105, 106 are created by arranging eccentering units 115, 116 in the ends of the shafts related to the first and second rotational axis, exchange of bearings or parts will be facilitated. The first and second sealing jaws 101, 102 are bearingly arranged, such as bearing mounted on a first eccentric shaft 105 and a second eccentric shaft 106, respectively. The first and second sealing jaws 101, 102 are aligned substantially horizontally and parallel to each other, such that an interaction surface on the first sealing jaw 101 faces an interaction surface on the second sealing jaw 102. The first sealing jaw 101 comprises a heating element, such as an induction element, for heating and thereby sealing the container by welding the sleeve together.

A bearing may be arranged, such as fitted, between the guiding pin 113, 114 and the guiding groove 111, 112. The bearing may for example be a polymeric box, of a highly durable and low friction polymer. A suitable polymer for this purpose may be selected from group comprising polytetra-flouroethylene (PTFE), polyetheretherketon (PEEK), polyimide (PI), polyethersulfon (PES), polyamide (PA), and polyoxymethylene (POM), or any combination of these. When the bearing is a polymeric box of this kind, an improved long-term fitting between the guiding groove and the guiding pin is achieved, since the plasticity of the polymeric material will compensate for the wear of the material. A large contact surface between the polymeric box and the guiding groove provides for an even better compensation for material wear. Thus, a substantially rectangular or square cross section in the transversal plane is provides for improved compensation for material wear. Due to the positioning of the guiding pins 113, 114 and the guiding grooves 111, 112 laterally of the sealing jaws 101, 102, a play in steering or positioning errors in the eccentric axes will only partly be transferred to the sealing jaws 101, 102, depending on the relationship between the distance from the guiding pins 113, 114 to the sealing jaws 101, 102, respectively, and the distance between the sealing jaws 101, 102 and the rotational axes 107, 108, respectively. In this way, such plays may be diminished by approximately 50 to 90% under normal circumstances, depending on said relationship.

A controller 120 (illustrated in FIGS. 2a and 2b) may be arranged to transmit control signals to said first and second servomotors 103, 104. The control signals allows for the transversal movement between said first sealing jaw and said second sealing jaw to be synchronized. When the rotations of the first and second sealing jaws 101, 102 are synchronized the first and second sealing jaws 101, 102 may interact during each rotation of the first and second eccentric shaft about said first rotational axis and said second rotational axis, respectively. The first and second servomotor 103, 104 will rotate said first and second eccentric shafts 105, 106 in opposite directions, such that the sealing jaws 101, 102 start to interact when moving downwardly. When the sealing jaws 101, 102 start to interact while moving downwards, the sealing action will simultaneously push the now sealed container downwards against a transport surface, carrying the container during the sealing step. This will initiate the folding of the container along pre-printed folding lines.

In one embodiment (not shown) the first and second guiding bar may also be bearing mounted on said first or second eccentric shaft. Still, the guiding bars are arranged transversally and perpendicularly to the longitudinal extension of the first and the second sealing jaw. The first and second guiding bar may then be attached in their proximal ends to the posterior and anterior end of the eccentric shafts, respectively. Thus, the guiding bars may be arranged anteriorly and posteriorly, respectively, in relation to the sealing jaws. Distally, such as in the distal end, the guiding bars are provided with one guiding groove each. The guiding grooves are aligned substantially horizontally. Also in this embodiment each guiding groove will enclose and cooperate with guiding pins, arranged on the other eccentric shaft, in the posterior and enterior end thereof.

According to one embodiment the apparatus according to above is comprised in a packaging machine for creating filled containers from blanks or sleeves (not shown). For convenience purposes only the blank embodiment will be referred to below. The packaging machine may comprise a transporter for transporting the blanks and semi manufactured containers between the different stages and units of the packaging machine. In one embodiment, the packaging machine comprises a loading unit, wherein blanks are stacked before being processed into a filled container. A folding unit and a bottom sealing unit may be arranged down streams of the loading unit. After the loading unit, folding unit and bottom sealing unit, the semi manufactured container is transported horizontally by the transporter in an upright position, i.e. with an open end facing upwards, and the now sealed and folded bottom end standing on the transporter. The semi manufactured containers are then brought by the transporter to a filling unit, wherein the containers are filled with the intended product. Down streams of the filling unit a top sealing apparatus according to the embodiments disclosed in FIGS. 1, 2a and 2b is positioned. The sealing apparatus seals the open top end of the semi manufactured containers. Since the guiding bars 109, 110 are separate from the sealing jaws 101, 102, and possibly upwardly arched, the semi manufactured containers will have free longitudinal and horizontal transport pathway, eliminating the need of complicated elevating or lowering actions of the sealing jaws or the semi manufactured container. Also, since the servomotors may be positioned below the transporter, and the space above the top sealing apparatus may be kept open, there is a minimized risk of contaminating the sealing apparatus with products, such as food products, thus limiting the cleaning needs. It will also be possible to seal more than one container during each rotation of the eccentric shafts 105, 106, by indexing the transporter in such way. After the top sealing action has been performed, the semi manufactured container may possibly be transported by the transporter to finalizing unit, performing a final folding of the top structure of the container. Thereafter, the container leaves the packaging machine.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. An apparatus for sealing an open end of a package, said apparatus comprising:
   a first longitudinally extending sealing jaw, bearing mounted on a first eccentric shaft, said first eccentric shaft rotating around a first rotational axis;
   a second longitudinally extending sealing jaw, bearing mounted on a second eccentric shaft, said second eccentric shaft rotating around a second rotational axis, said second sealing jaw being parallel with said first sealing jaw;
   at least one motor driving the rotation around said first and second rotational axis in opposite directions;
   wherein the first and the second sealing jaws are opposing each other, and are allowed to oscillate between a sealing and an open position, by moving towards and away from each other;
   a first and a second transversally extending guiding bar, bearing mounted between said first and second eccentric shaft; and
   said first and a second transversally extending guiding bar cooperating with said first and second eccentric shaft via guiding pins running in guiding grooves, such that a play between the first and the second eccentric shaft and the first and second sealing jaw is allowed in a transversal direction.

2. The apparatus according to claim 1, wherein a first motor drives the rotation around the first rotational axis, and a second motor drives the rotation around the second rotational axis.

3. The apparatus according to claim 2, comprising a controller arranged to transmit control signals to said first and second motor, such that the transversal movement between said first sealing jaw and said second sealing jaw are synchronized to interact during each rotation of the first and second eccentric shaft around said first rotational axis and said second rotational axis, respectively.

4. The apparatus according to claim 1, wherein the eccentric shafts have a greater longitudinal extension than the sealing jaws.

5. The apparatus according to claim 1, wherein the first and the second sealing jaws have anterior and posterior ends within the longitudinal extensions of the eccentric shafts.

6. The apparatus according to claim 1, wherein the guiding bars are arranged transversally and perpendicularly to the longitudinal extension of the first and the second sealing jaw, and anteriorly and posteriorly, respectively, in relation to the sealing jaws.

7. The apparatus according to claim 1, wherein a first guiding pin is attached to said first eccentric shaft, said first guiding pin running in a first guiding groove in a distal end of said first guiding bar.

8. The apparatus according to claim 1, wherein a second guiding pin is attached to said second eccentric shaft, said second guiding pin running in a second guiding groove in a distal end of said second guiding bar.

9. The apparatus according to claim 1, wherein the guiding bars are arched upwardly.

10. The apparatus according to claim 1, wherein said guiding pins are provided with a bearing, fitted in said guiding grooves.

11. The apparatus according to claim 1, wherein said guiding pins are provided with a polymeric block, fitted in said guiding grooves.

12. The apparatus according to claim 7, wherein said polymer is polytetraflouroethylene, polyetheretherketon, polyimide, polyethersulfon, polyamide, and polyoxymethylene, or any combination of these.

13. The apparatus according to claim 1, wherein the guiding grooves are aligned substantially horizontally.

14. The apparatus according to claim 1, wherein the sealing jaws are aligned substantially horizontally.

15. The apparatus according to claim 1, wherein the at least one motor is arranged to rotate said first and second eccentric shaft in opposite directions, such that the sealing jaws start to interact when moving downwardly.

16. A packaging machine for creating filled containers from blanks, comprising an apparatus according to claim 1 and a filling unit for filling the containers with a product, wherein the apparatus is positioned down streams from the filling unit.

* * * * *